Aug. 19, 1924.
A. H. STEBBINS
1,505,743
SEPARATOR
Filed Oct. 26, 1922      4 Sheets-Sheet 1
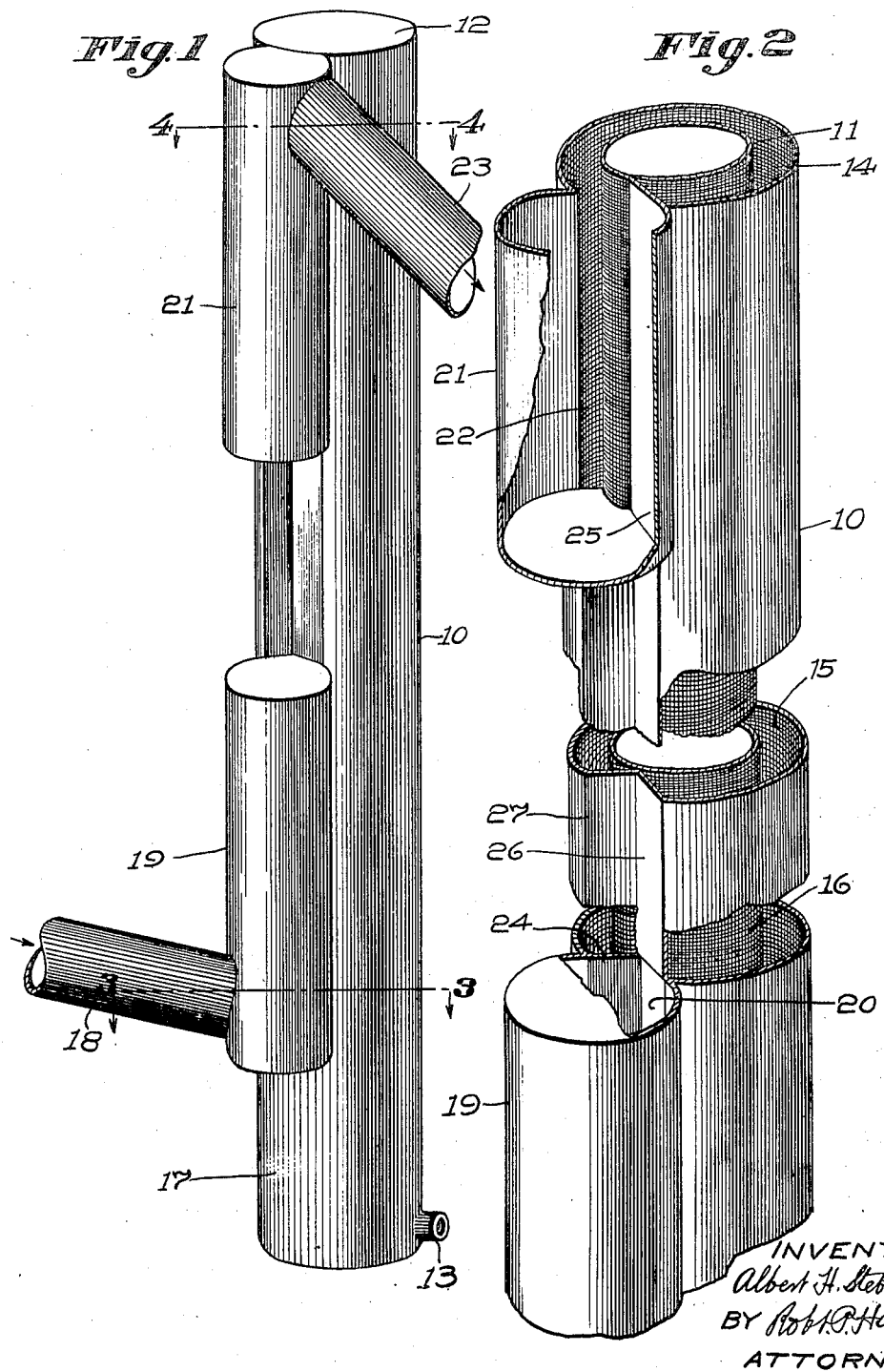

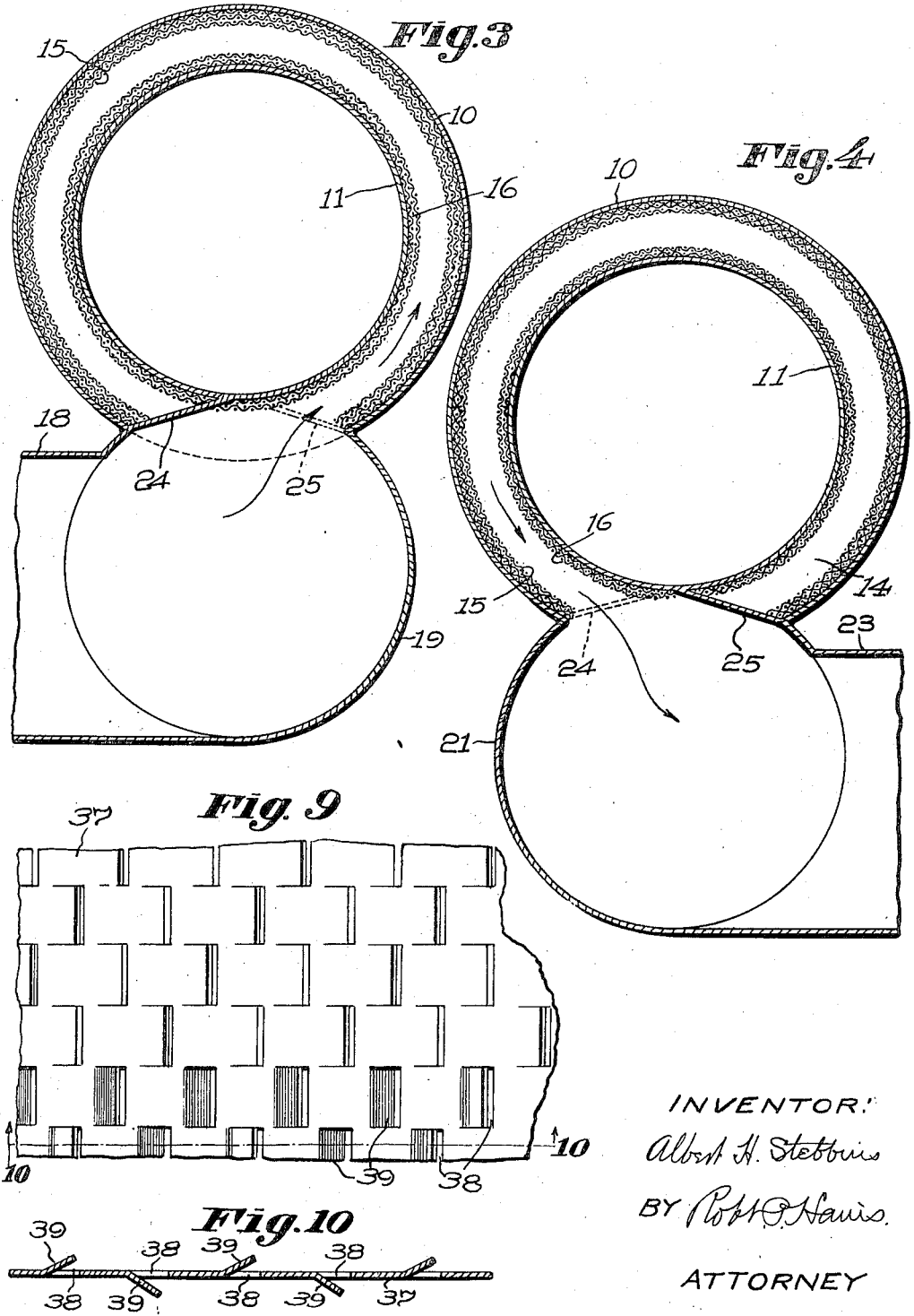

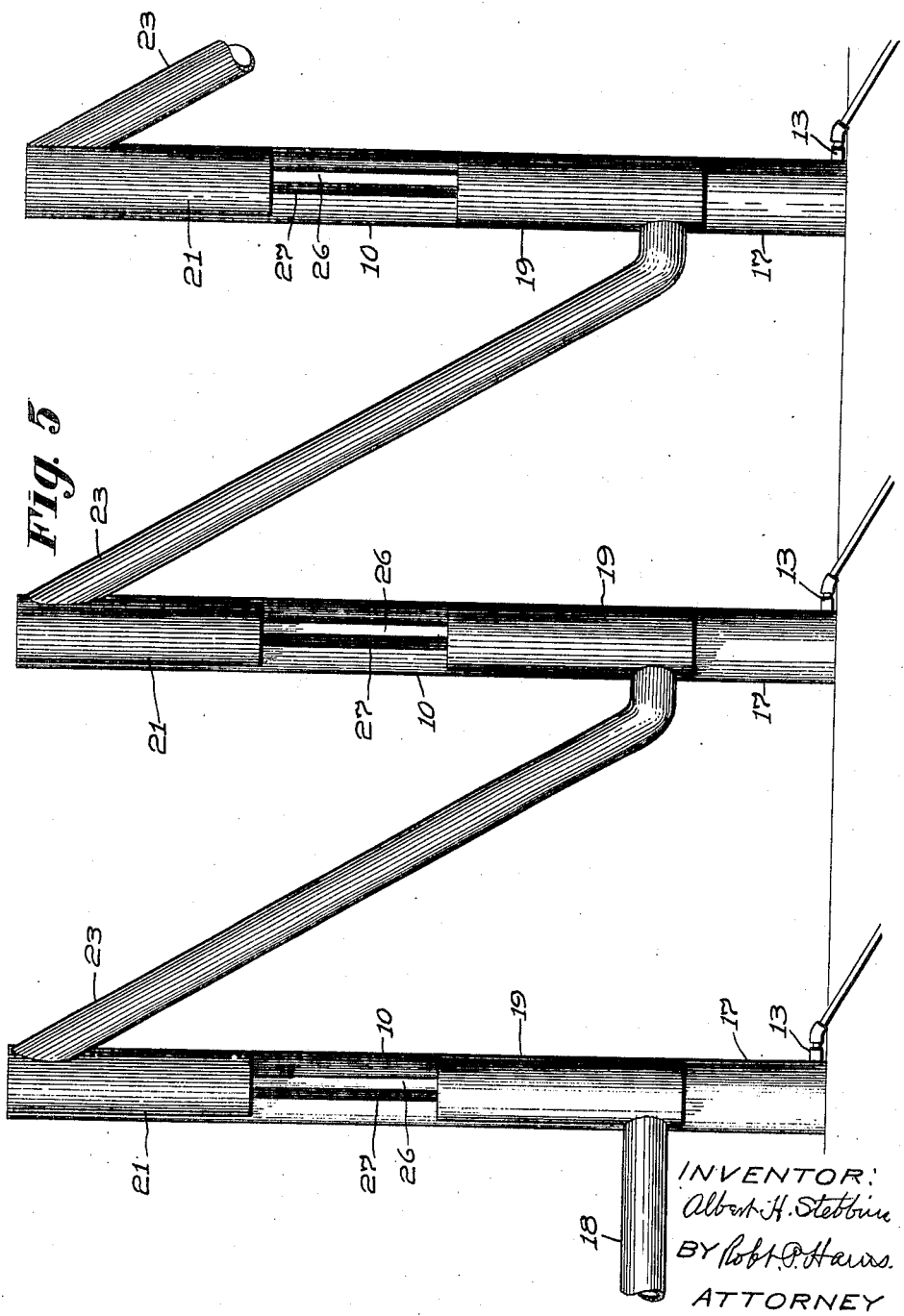

Aug. 19, 1924.

A. H. STEBBINS
SEPARATOR
Filed Oct. 26, 1922

INVENTOR.
Albert H. Stebbins
BY Robt P Harris
ATTORNEY

Patented Aug. 19, 1924.

1,505,743

UNITED STATES PATENT OFFICE.

ALBERT H. STEBBINS, OF LOS ANGELES, CALIFORNIA.

SEPARATOR.

Application filed October 26, 1922. Serial No. 597,075.

*To all whom it may concern:*

Be it known that I, ALBERT H. STEBBINS, a citizen of the United States, residing at Los Angeles, in the county of Los Angeles and State of California, have invented an Improvement in Separators, of which the following description, in connection with the accompanying drawings, is a specification, like characters on the drawings representing like parts.

The invention to be herein described relates to separators for removing liquid from a gaseous fluid in which it may be suspended.

The present invention is well adapted to treat natural gas as it comes from the wells to remove the oil, gasoline and other petroleum products therefrom, and the invention is also well adapted to remove moisture from steam or air, and for various other purposes.

One feature of the invention resides in a drum or container having an annular chamber therein through which the fluid to be treated is passed, and having screens or other means within the annular chamber that provide rough surfaces upon which the liquid within the fluid may be deposited.

Another feature of the invention resides in a construction by which the fluid to be treated is caused to travel about the annular chamber and lengthwise thereof.

A more specific feature of the invention resides in the disposition of screens or other sheet material having a rough surface within the annular chamber so that the fluid being treated will travel over the rough surface with scrubbing effect.

Still another feature of the invention resides in a separator unit for removing liquid from a gaseous fluid, and consisting of a plurality of separators connected in series for the passage of fluid successively through the separators.

Other features of the invention and novel combination of parts in addition to the above will be hereinafter described in connection with the accompanying drawings which illustrate one good practical form thereof.

In the drawings:

Fig. 1 is a perspective view of a separator constructed in accordance with the present invention;

Fig. 2 is an enlarged perspective view of the separator of Fig. 1 with parts broken away;

Fig. 3 is a sectional view taken on line 3—3 of Fig. 1;

Fig. 4 is a sectional view taken on line 4—4 of Fig. 1;

Fig. 5 is a side elevation of a separator unit consisting of several separators connected in series;

Fig. 9 is an enlarged side view of a perforated sheet to be described; and

Fig. 10 is a horizontal sectional view taken on the line 10—10 of Fig. 9.

Figure 6:
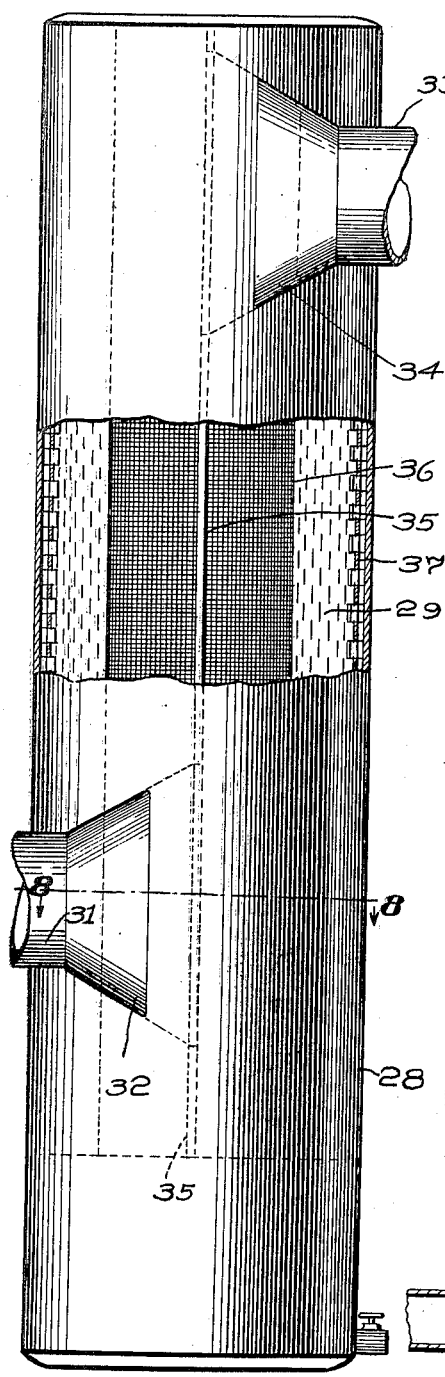
Fig. 6 is a side elevation of a modified type of separator.

In the embodiment of the invention shown in Figs. 1 to 4 inclusive, a container 10 is provided preferably in the form of a drum, and is supported in standing position by suitable means (not shown).

The drum or container 10 preferably has an annular chamber 14 formed therein and to this end a tube 11 is mounted centrally within the container. The upper end of the drum or container is closed by a cover 12 and the lower end is closed to form a tank in which the liquid separated from the gaseous fluid being treated may be deposited, this fluid may be withdrawn from the tank through an opening 13.

It is desirable to provide the walls of the annular chamber 14 formed between the drum 10 and tube 11 with a rough surface upon which the liquid within the gaseous fluid may be deposited, and to this end in the construction shown in Figs. 1 to 4 inclusive, the inner wall of the drum 10 is lined with one or more layers of an apertured screen 15 which may consist of wire screen of the desired mesh, and the outer wall of the tube 11 may be covered with a similar screen 16.

The gaseous fluid to be treated preferably is introduced into the annular chamber 14 near one end thereof and is caused to pass about this chamber and lengthwise thereof so that the gaseous fluid will pass over the rough surfaces lining the annular chamber with scrubbing effect and will deposit the liquid therein upon the walls 15 and 16 whereupon this liquid may trickle downward into the tank 17 at the lower end of the drum.

It is desirable that the gaseous fluid to be treated be delivered into the annular chamber 14 so that it will pass about this chamber and lengthwise thereof, and to this end in the construction shown in Figs. 1 to 4 inclusive the gaseous fluid to be treated is delivered by a pipe 18 into an auxiliary receptacle 19 which is secured to one side of the drum 10 near the end of the annular chamber 14, and the receptacle communicates with the annular chamber through an elongated opening or slot 20. This receptacle 19 is of sufficient length to permit the slot 20 to extend lengthwise of the drum 10 a substantial distance so that the gaseous fluid may be delivered into the drum 10 along a substantial portion of the annular chamber 14. The gaseous fluid that has been treated may be discharged from the upper portion of the annular chamber 14 into a similar receptacle 21 through an elongated slot or opening 22 and may be led from the receptacle 21 through a pipe 23.

The gaseous fluid is directed from the receptacle 19 into the annular chamber 14 in substantially a tangential direction by a partition 24, and a similar partition 25 extending from the upper receptacle 21 into the annular chamber 14 serves to promote flow of the gaseous fluid in the upper portion of the chamber 14 in the general direction in which it travels in the lower portion of this chamber, and the partition 25 serves also to arrest the flow of the fluid around the annular chamber in the opposite direction. It is important to prevent the gaseous fluid from passing direct from the inlet slot 20 to the outlet slot 22 without passing around the annular chamber 14 and to this end partitions 26 and 27 are provided across the annular chamber 14 and extend lengthwise thereof from adjacent the inlet slot 20 to adjacent the outlet slot 22, as will be apparent from Figs. 1 and 2. As a result of these partitions the gaseous fluid that enters through the slot 20 cannot reach the slot 22 except by passing around the annular chamber 14 in the direction indicated by the arrows in Figs. 3 and 4, and as the gaseous fluid passes around this annular chamber and lengthwise thereof the liquid therein will be deposited upon the rough surfaces of the walls 15 and 16. The inlet slot 20 and outlet slot 22 are preferably disposed a substantial distance apart lengthwise of the drum 10, so that the fluid will travel around the chamber 14 and lengthwise of the chamber a substantial distance, further to promote separation of the liquid from the gas.

The gaseous fluid to be treated may be passed through the separator of the present invention either by blast or suction and this may be accomplished by delivering the fluid through the pipe 18 under pressure, or by producing a suction within the outlet pipe 23 which will draw the fluid through the receptacle. In some cases it may be desirable to pass the fluid to be treated through several separators of the type shown in Figs. 1 to 4 inclusive for successive treatment, and in this case these separators may be arranged in series as shown in Fig. 5, so that the gaseous fluid which leaves one discharge receptacle 21 through the pipe 23 will be delivered into the next receptacle 19, and the rough surfaces or screens provided within the annular chambers within each of the drums 10 may be varied so that one separator will serve to remove liquid which was not removed from the fluid by the preceding separator.

Figure 7:
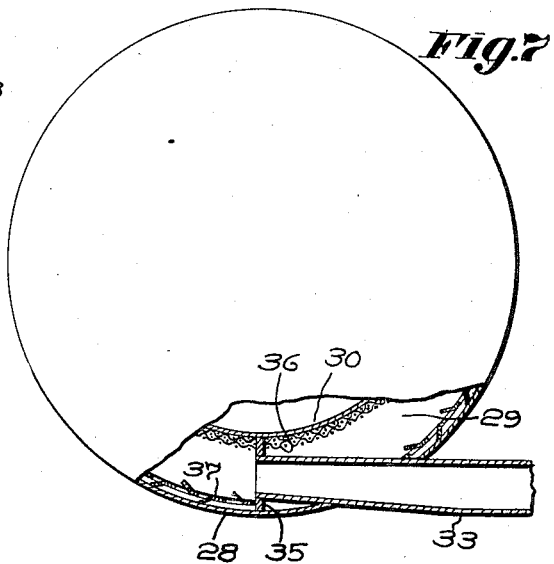
Fig. 7 is a top plan view of Fig. 6 with parts broken away.
Figure 8:
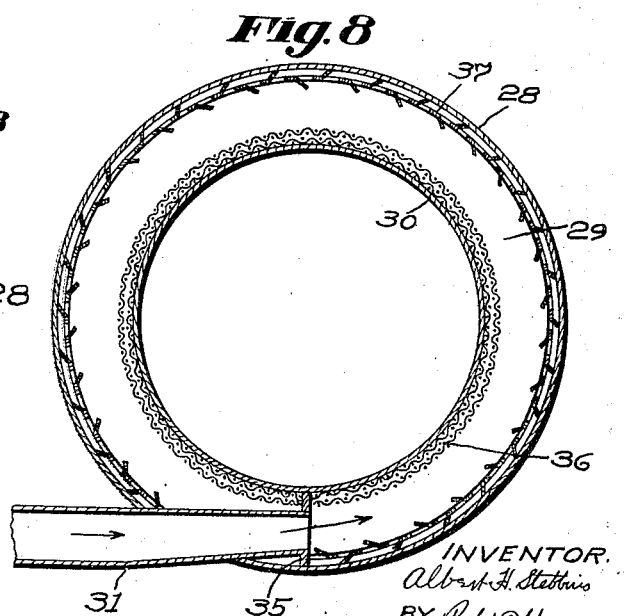
Fig. 8 is a sectional view taken on the line 8—8 of Fig. 6.

A somewhat modified construction is shown in Figs. 6, 7 and 8, wherein a closed container or drum 28 is provided which has an annular chamber 29 formed therein by providing a tube 30 centrally within the drum 28 and in this construction the receptacles 19 and 21 of Figs. 1 to 4 have been omitted and the fluid to be treated is delivered directly in a substantially tangential direction into the annular chamber 29 by an inlet pipe 31 which preferably has a flaring mouth 32, as shown in Fig. 6. The fluid which is passed through the annular chamber 29 may be delivered therefrom through an outlet pipe 33 preferably having a flaring mouth 34, and to prevent the fluid being treated from passing directly from the inlet pipe 31 to the outlet pipe 33 without passing around the annular chamber a partition 35 is provided which extends throughout the length of the annular chamber 29 and this partition has an opening therein through which the flaring mouth 32 extends and a second opening therein through which the flaring mouth 34 extends, so that the gaseous fluid is delivered into the annular chamber upon one side of the partition 35 and passes around the annular chamber while traveling lengthwise thereof to the opposite side of this partition.

It is important that the opposite walls of the annular chamber 29 be provided with roughened surfaces upon which the liquid within the gaseous fluid will be deposited. These roughened surfaces may be variously constructed, and in Figs. 6, 7 and 8 the outer wall of the tube 30 is covered by a wire screen or the like 36, whereas, in this construction, the inner wall of the drum 28 is lined with a screen formed from a sheet of perforated metal 37 having apertures 38 therein, and lips 39 adjacent the apertures that are bent alternately in opposite directions, as will be apparent from Figs. 9 and 10. The lips 39 which extend in one direction serve to hold the perforated plate 37 in spaced relation to the inner wall of the drum 28 and thus form a chamber in which the liquid which collects therein may pass downwardly between the drum and the plate 37 to the tank at the lower end of the drum, and the lips 39 which extend into the annular chamber 29 serve to arrest the liquid within the gaseous fluid and to promote the deposit of this liquid upon the perforated plate 37. The construction shown in Figs. 6 to 10 inclusive is particularly well adapted for the suction type of separator since in this type it is found that the lips 39 will arrest the liquid within the gaseous fluid without materially checking the travel of the fluid produced by suction through the annular chamber 29.

Although the type of perforated screen 37 formed of sheet metal is shown as applied only to the inner wall of the drum shown in Figs. 6, 7 and 8, it will be apparent that this type of screen is also well adapted for use in the type of separator disclosed in Figs. 1 to 4 inclusive, and that it may also be used either to line the inner face of the drum or to cover the tube disposed within the drum.

What is claimed is:

1. A separator for removing liquid from a gaseous fluid, comprising in combination, a drum having an annular chamber therein, means for passing the gaseous fluid to be treated through the annular chamber, and an apertured screen within the annular chamber and having lips extending from one side thereof to space the screen from a wall and having lips extending from the opposite side into the path of the fluid to arrest the liquid within the fluid.

2. A separator for removing liquid from a gaseous fluid, comprising in combination, a drum having an annular chamber formed therein, an auxiliary receptacle secured to a side wall of the drum and arranged to direct the fluid tangentially into the annular chamber near one end of the drum, a second auxiliary receptacle secured to a side wall of the drum near the opposite end of the latter and into which the annular chamber discharges, a partition within the annular chamber for insuring travel of the fluid around the chamber in passing from one receptacle to the other, and apertured lining for the opposite walls of the chamber upon which the liquid within the gaseous fluid is deposited.

3. A separator for removing liquid from a gaseous fluid comprising in combination, a relatively long drum having an annular chamber therein, means for delivering fluid into the annular chamber near one end and for discharging the fluid near the opposite end, a partition for insuring travel of the fluid around the annular chamber in passing lengthwise thereof, and apertured lining within the annular chamber and having lips extending from one side thereof to space the lining from a wall and having lips extending from the opposite side into the path of the fluid to arrest the liquid within the fluid.

4. A separator for removing liquid from a gaseous fluid, comprising in combination, a container having a passage therethrough, means for passing the gaseous fluid to be treated through the passage of the container, and apertured lining within said passage and having lips extending from one side thereof to space the lining from a wall and having lips extending from the opposite side into the path of the fluid to arrest the liquid within the fluid.

5. A separator for removing liquid from a gaseous fluid comprising in combination, a relatively long drum having a tube disposed centrally therein to form an annular chamber between the drum and tube and having an inlet near one end and outlet near the other end, means for delivering fluid tangentially into the drum so that it will travel around the annular chamber and lengthwise thereof, and a double lining of wire screen placed about said tube to provide a thick pervious wall which the gaseous fluid may enter and deposit therein the suspended liquid.

6. A separator for removing liquid from a gaseous fluid comprising in combination, a relatively long drum having a tube disposed centrally therein to form an annular chamber between the drum and tube and having an inlet near one end and an outlet near the other end, means for delivering fluid into the drum so that it will travel around the annular chamber and lengthwise thereof, a screen lining for the inner wall of the drum upon which liquid is deposited, and a double screen lining surrounding said tube and providing a thick pervious wall that the gaseous fluid may enter and deposit therein the suspended liquid.

7. A separator for removing liquid from a gaseous fluid comprising in combination, a relatively long drum having a tube disposed centrally therein to form an annular chamber between the drum and tube and having an inlet near one end and an outlet near the other end, means for delivering fluid into the annular chamber, a partition within said chamber for blocking the direct path between the inlet and outlet to effect travel of the fluid around the annular chamber in passing from the inlet to the outlet, and a double lining of wire screen surrounding said tube and forming a thick pervious wall which the gaseous fluid will enter and deposit therein the suspended liquid.

8. A separator for removing liquid from a gaseous fluid comprising in combination, a relatively long drum having a tube disposed centrally therein to form an annular chamber between the drum and tube, means for delivering the fluid to be treated into the annular chamber near one end and for conducting the fluid from the chamber near the other end so that the fluid travels lengthwise of the chamber a substantial distance, a vertically disposed partition adjacent the inlet and extending across the annular chamber to direct the fluid about the annular chamber in one direction, a second vertically disposed partition adjacent the outlet and arranged to arrest flow of the fluid around the annular chamber past the outlet, and apertured surfaces within the annular chamber upon which the liquid in the fluid is deposited.

In testimony whereof, I have signed my name to this specification.

ALBERT H. STEBBINS.